United States Patent
Chung et al.

(10) Patent No.: US 11,574,239 B2
(45) Date of Patent: Feb. 7, 2023

(54) OUTLIER QUANTIZATION FOR TRAINING AND INFERENCE

(71) Applicant: Microsoft Technology Licensing, LLC, Redmond, WA (US)

(72) Inventors: Eric S. Chung, Redmond, WA (US); Daniel Lo, Bothell, WA (US); Ritchie Zhao, Ithaca, NY (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 967 days.

(21) Appl. No.: 16/357,192

(22) Filed: Mar. 18, 2019

(65) Prior Publication Data

US 2020/0302330 A1    Sep. 24, 2020

(51) Int. Cl.
| | |
|---|---|
| G06N 20/00 | (2019.01) |
| G06F 3/08 | (2006.01) |
| G06F 17/15 | (2006.01) |
| G06F 17/16 | (2006.01) |
| G06N 5/04 | (2006.01) |

(52) U.S. Cl.
CPC .............. G06N 20/00 (2019.01); G06F 3/08 (2013.01); G06F 17/15 (2013.01); G06F 17/16 (2013.01); G06N 5/04 (2013.01)

(58) Field of Classification Search
CPC .......... G06N 20/00; G06N 5/04; G06N 3/063; G06F 3/08; G06F 17/15; G06F 17/16; G06F 7/4876; G06F 7/5324; G06F 7/5443
See application file for complete search history.

(56) References Cited

U.S. PATENT DOCUMENTS

| | | | |
|---|---|---|---|
| 2020/0210839 A1* | 7/2020 | Lo | G06N 20/00 |
| 2020/0210840 A1* | 7/2020 | Darvish Rouhani | G06N 3/063 |

(Continued)

FOREIGN PATENT DOCUMENTS

WO    2019212836 A1    11/2019

OTHER PUBLICATIONS

Liu, et al., "DARTS: Differentiable Architecture Search", In Journal of Computing Research Repository, Jun. 2018, pp. 1-12.

(Continued)

*Primary Examiner* — Naum Levin
(74) *Attorney, Agent, or Firm* — Newport IP, LLC; Leonard J. Hope

(57) ABSTRACT

Machine learning may include training and drawing inference from artificial neural networks, processes which may include performing convolution and matrix multiplication operations. Convolution and matrix multiplication operations are performed using vectors of block floating-point (BFP) values that may include outliers. BFP format stores floating-point values using a plurality of mantissas of a fixed bit width and a shared exponent. Elements are outliers when they are too large to be represented precisely with the fixed bit width mantissa and shared exponent. Outlier values are split into two mantissas. One mantissa is stored in the vector with non-outliers, while the other mantissa is stored outside the vector. Operations, such as a dot product, may be performed on the vectors in part by combining the in-vector mantissa and exponent of an outlier value with the out-of-vector mantissa and exponent.

20 Claims, 8 Drawing Sheets

(56) References Cited

U.S. PATENT DOCUMENTS

2020/0264876 A1* 8/2020 Lo ..................... G06K 9/6262
2020/0302283 A1* 9/2020 Zhu ..................... G06N 3/063

OTHER PUBLICATIONS

Park, et al., "Energy-efficient Neural Network Accelerator Based on Outlier-aware Low-precision Computation", In Proceedings of ACM/IEEE 45th Annual International Symposium on Computer Architecture (ISCA), Jun. 1, 2018, pp. 688-698.

Drumond et al., "End-to-End DNN Training with Block Floating Point Arithmetic", In Repository of arXiv:1804.01526, Apr. 9, 2018, 9 Pages.

Drumond et al., "Training DNNs with Hybrid Block Floating Point", In Proceedings of The Neural Information Processing Systems, Dec. 2, 2018, 11 Pages.

Park et al., "Deep Learning Inference in Facebook Data Centers: Characterization, Performance", In Repository of arXiv:1811.09886, Nov. 24, 2018, pp. 1-12.

International Search Report and Written Opinion Issued in PCT Application No. PCT/US20/021624, dated Jun. 16, 2020, 15 Pages.

* cited by examiner

OUTLIER QUANTIZATION FOR TRAINING AND INFERENCE

BACKGROUND

Artificial neural networks ("ANNs" or "NNs") are applied to a number of applications in Artificial Intelligence ("AI") and Machine Learning ("ML"), including image recognition, speech recognition, search engines, and other suitable applications. ANNs are typically trained across multiple "epochs." In each epoch, an ANN trains over all of the training data in a training data set in multiple steps. In each step, the ANN first makes a prediction for an instance of the training data (which might also be referred to herein as a "sample"). This step is commonly referred to as a "forward pass" (which might also be referred to herein as a "forward training pass"), although a step may also include a backward pass.

To make a prediction, a training data sample is fed to the first layer of the ANN, which is commonly referred to as an "input layer." Each layer of the ANN then computes a function over its inputs, often using learned parameters, or "weights," to produce an input for the next layer. The output of the last layer, commonly referred to as the "output layer," is a class prediction, commonly implemented as a vector indicating the probabilities that the sample is a member of a number of classes. Based on the label predicted by the ANN and the actual label of each instance of training data, the output layer computes a "loss," or error function.

In a "backward pass" (which might also be referred to herein as a "backward training pass") of the ANN, each layer of the ANN computes the error for the previous layer and the gradients, or updates, to the weights of the layer that move the ANN's prediction toward the desired output. The result of training a ANN is a set of weights, or "kernels," that represent a transform function that can be applied to an input with the result being a classification, or semantically labeled output.

After an ANN is trained, the trained ANN can be used to classify new data. Specifically, a trained ANN model can use weights and biases computed during training to perform tasks (e.g. classification and recognition) on data other than that used to train the ANN. General purpose central processing units ("CPUs"), special purpose processors (e.g. graphics processing units ("GPUs"), tensor processing units ("TPUs") and field-programmable gate arrays ("FPGAs")), and other types of hardware can be used to execute an ANN model.

ANNs commonly use normal-precision floating-point formats (e.g. 16-bit, 32-bit, 64-bit, and 80-bit floating-point formats) for internal computations. Training ANNs can be a very compute and storage intensive task, taking billions of operations and gigabytes of storage. Performance, energy usage, and storage requirements of ANNs can, however, be improved through the use of quantized-precision floating-point formats during training and/or inference. Examples of quantized-precision floating-point formats include formats having a reduced bit width (including by reducing the number of bits used to represent a number's mantissa and/or exponent) and block floating-point ("BFP") formats that use a small (e.g. 3, 4, or 5-bit) mantissa and an exponent shared by two or more numbers. The use of quantized-precision floating-point formats can, however, have certain negative impacts on ANNs such as, but not limited to, a loss in accuracy.

It is with respect to these and other technical challenges that the disclosure made herein is presented.

SUMMARY

Technologies are disclosed herein for outlier quantization for ANN training and inference. In some configurations, computerized implementations of convolution and/or vector operations are optimized. For example, convolutions and/or vector operations are optimized for computation using BFP floating-point values. Many technical benefits flow from the use of outlier quantization for training and inference. Implementations of the disclosed technologies improve performance, reduce compute resource requirements, reduce energy consumption, and improve responsiveness when training and drawing inferences from ANNs. Operations performed on BFP vectors can be more efficient than the same operations performed on vectors of traditional floating-point values. By allowing for outlier values, claimed configurations enable a larger range of values without increasing the defined number of bits used to represent a mantissa. This allows vectors with larger ranges of values to benefit from the compute efficiencies of BFP without sacrificing the storage efficiencies of BFP.

The disclosed technologies might be used, for example, to perform matrix multiplications, convolutions, and other operations used to train and draw inference from artificial neural networks. In some configurations, the vectors store floating-point values in BFP format—i.e. each vector is associated with a shared exponent, and each element of the vector is represented by a mantissa of a defined number of bits. Elements may be outliers—values that are too large or too small to be represented with the defined mantissa size and shared exponent to a defined number of digits of precision.

In some configurations, outlier values are split into two mantissas and two exponents. One mantissa and exponent pair is stored in the vector with non-outliers, while the other mantissa and exponent pair is stored outside the vector. Operations, such as a dot product, may be performed on the vectors in part by combining the in-vector mantissa and exponent of an outlier value with the out-of-vector mantissa and exponent.

It should be appreciated that the above-described subject matter can be implemented as a computer-controlled apparatus, a computer-implemented method, a computing device, or as an article of manufacture such as a computer readable medium. These and various other features will be apparent from a reading of the following Detailed Description and a review of the associated drawings.

This Summary is provided to introduce a brief description of some aspects of the disclosed technologies in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
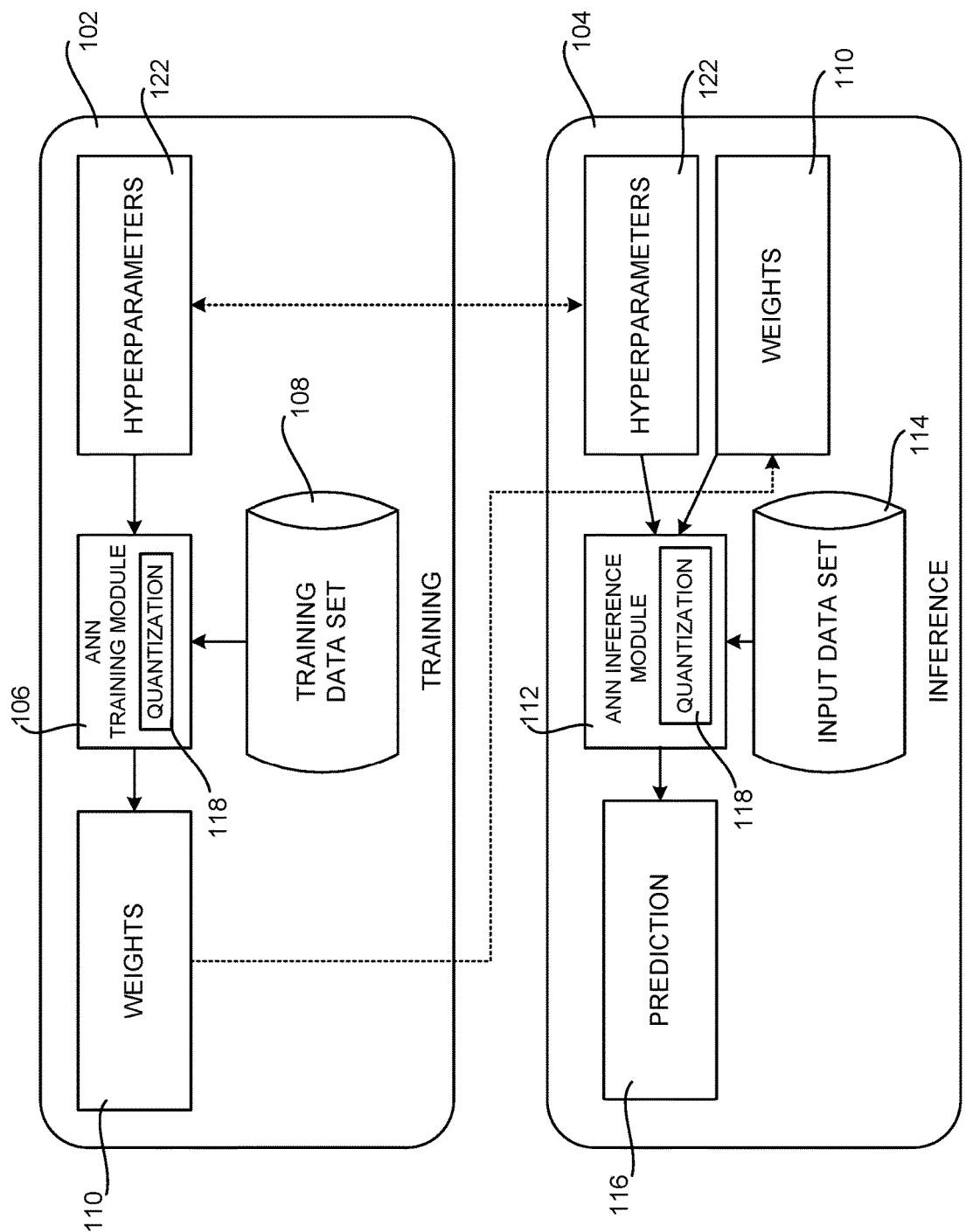
FIG. 1 is a computing architecture diagram that shows aspects of the configuration of a computing system disclosed herein that is capable of quantizing activations and weights during ANN training and inference, according to one embodiment disclosed herein.

The following detailed description is directed to technologies for outlier quantization for training and inference. In addition to other technical benefits, the disclosed technologies can improve the accuracy or inference time of ANNs. This can conserve computing resources including, but not limited to, memory, processor cycles, network bandwidth, and power. Other technical benefits not specifically identified herein can also be realized through implementations of the disclosed technologies.

Referring now to the drawings, in which like numerals represent like elements throughout the several FIGS., aspects of various technologies for outlier quantization for training and inference will be described. In the following detailed description, references are made to the accompanying drawings that form a part hereof, and which are shown by way of illustration specific configurations or examples.

Overview of ANNs and ANN Training

Figure 2A:
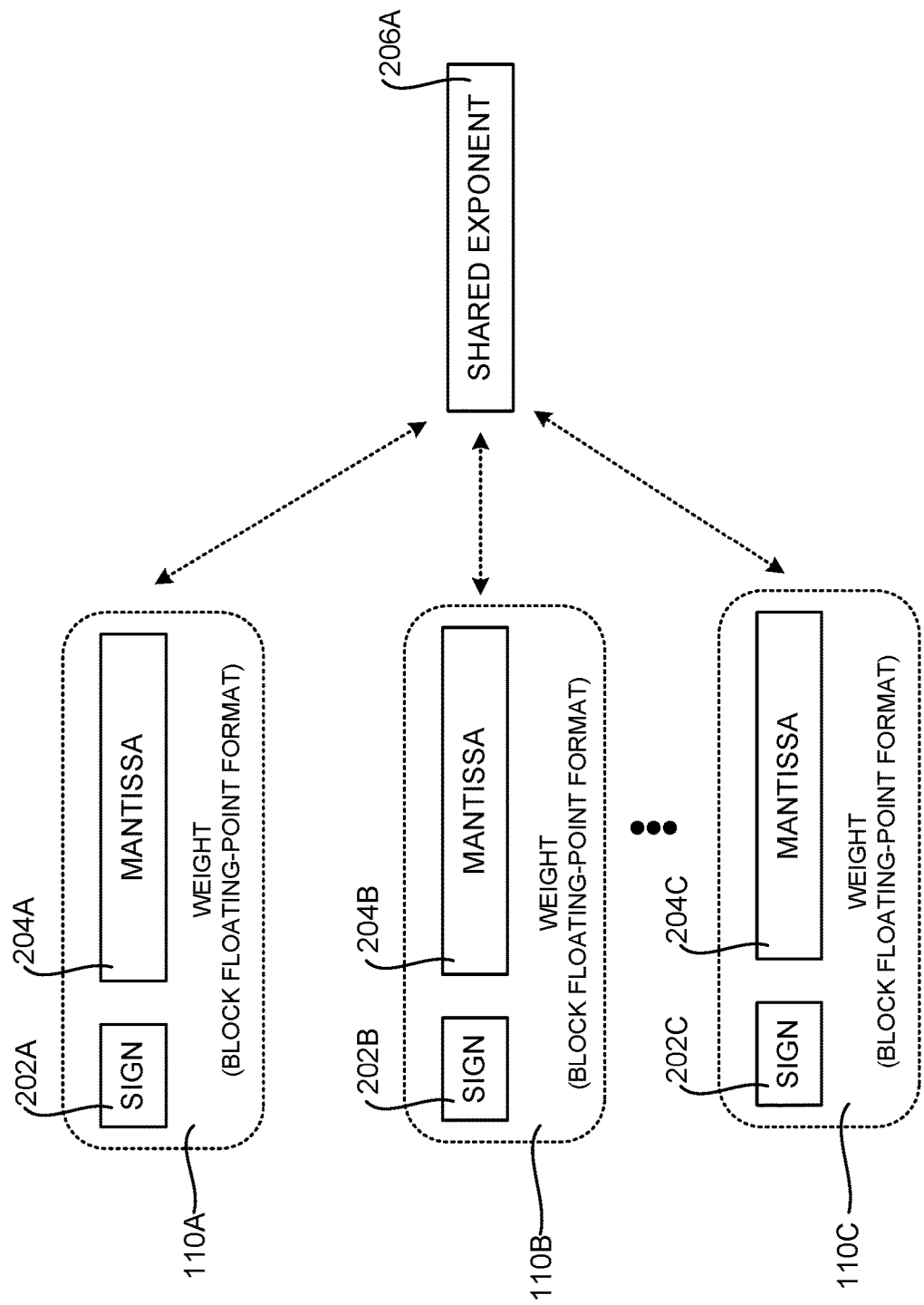
FIGS. 2A and 2B are data structure diagrams showing aspects of one mechanism for using a quantized-precision floating-point format to represent weights and activation values in an ANN, according to one embodiment disclosed herein.
Figure 2B:
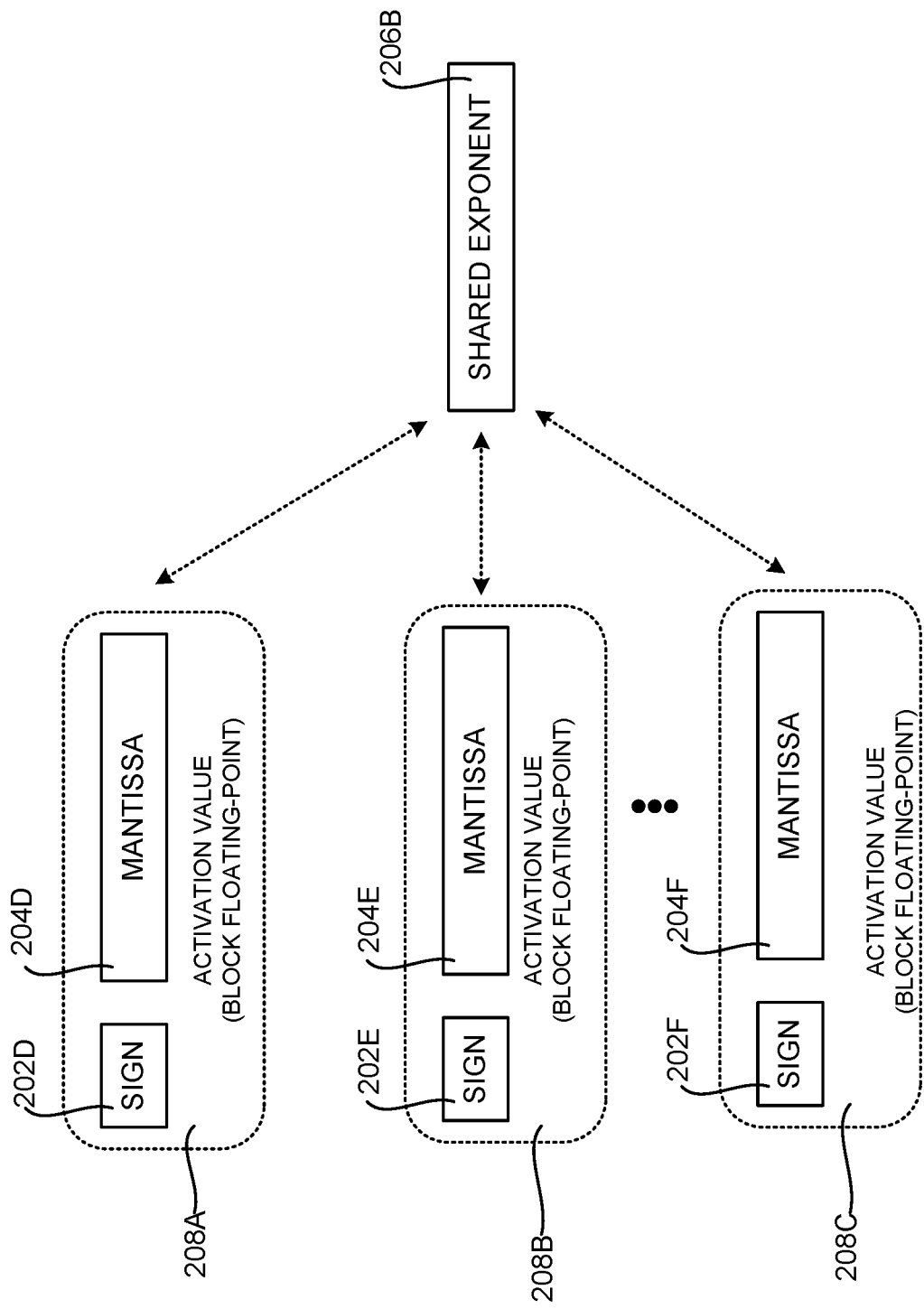

Prior to describing the disclosed technologies for outlier quantization for training and inference, a brief overview of ANNs, ANN training, and quantization will be provided with reference to FIGS. 1-2B. As described briefly above, ANNs are applied to a number of applications in AI and ML including, but not limited to, recognizing images or speech, classifying images, translating speech to text and/or to other languages, facial or other biometric recognition, natural language processing ("NLP"), automated language translation, query processing in search engines, automatic content selection, analyzing email and other electronic documents, relationship management, biomedical informatics, identifying candidate biomolecules, providing recommendations, or other classification and AI tasks.

The processing for the applications described above may take place on individual devices such as personal computers or cell phones, but it might also be performed in datacenters. Hardware accelerators can also be used to accelerate ANN processing, including specialized ANN processing units, such as TPUs, FPGAs, and GPUs programmed to accelerate NN processing. Such hardware devices can be deployed in consumer devices as well as in data centers due to their flexible nature and low power consumption per unit computation.

An ANN generally consists of a sequence of layers of different types (e.g. convolution, ReLU, fully connected, and pooling layers). As shown in FIG. 1, hyperparameters 122 can define the topology of an ANN. For instance, the hyperparameters 122 can include topology parameters that define the topology, or structure, of an ANN including, but not limited to, the number and type of layers, groupings of layers, connections between the layers, and the number of filters. The hyperparameters 122 can also define other aspects of the configuration and/or operation of an ANN.

Training 102 of ANNs typically utilizes a training data set 108. The training data set 108 includes samples (e.g. images) for applying to an ANN and data describing a desired output from the ANN for each respective sample in the training data set 108 (e.g. a set of images that have been labeled with data describing the actual content in the images).

ANNs are typically trained across multiple "epochs." In each epoch, an ANN training module 106, or another component, trains an ANN over the training data in a training data set 108 in multiple steps. In each step, the ANN first makes a prediction for an instance of the training data (which might also be referred to herein as a "sample"). This step is commonly referred to as a "forward pass" (which might also be referred to herein as a "forward training pass").

To make a prediction, a training data sample is fed to the first layer of the ANN, which is commonly referred to as an "input layer." Each layer of the ANN then computes a function over its inputs, often using learned parameters, or "weights 110" to produce an output (commonly referred to as an "activation"), which is used as an input for the next layer. The output of the last layer, commonly referred to as the "output layer," is a class prediction, commonly implemented as a vector indicating the probabilities that the sample is a member of a number of classes. Based on the label predicted by the ANN and the label associated with each instance of training data in the training data set 108, the output layer computes a "loss," or error function.

In a "backward pass" (which might also be referred to herein as a "backward training pass") of the ANN, each layer of the ANN computes the error for the previous layer and the gradients, or updates, to the weights 110 of the layer that move the ANN's prediction toward the desired output. The result of training an ANN is a set of weights 110 that represent a transform function that can be applied to an input with the result being a prediction 116. A modelling framework such as those described below can be used to train an ANN in this manner.

After an ANN model has been trained, a component of a modelling framework (e.g. the ANN inference module 112 shown in FIG. 1) can be used during inference 104 to make a prediction 116 regarding the classification of samples in an input data set 114 that are applied to the trained ANN. Specifically, the topology of an ANN is configured using the hyperparameters 112 that were used during training 102. The ANN then uses the weights 110 (and biases) obtained during training 102 to perform classification, recognition, or other types of tasks on samples in an input data set 114, typically samples that were not used during training. Such a modelling framework can use general purpose CPUs, special purpose processors (e.g. GPUs, TPUs, or FPGAs), and other types of hardware to execute an ANN and generate predictions 116 in this way.

In some examples, proprietary or open source libraries or frameworks are utilized to facilitate ANN creation, training 102, evaluation, and inference 104. Examples of such libraries include, but are not limited to, TENSORFLOW, MICROSOFT COGNITIVE TOOLKIT ("CNTK"), CAFFE, THEANO, and KERAS. In some examples, programming tools such as integrated development environments ("IDEs") provide support for programmers and users to define, compile, and evaluate ANNs.

Tools such as those identified above can be used to define, train, and use ANNs. As one example, a modelling framework can include pre-defined application programming interfaces ("APIs") and/or programming primitives that can be used to specify one or more aspects of an ANN, such as the hyperparameters 122. These pre-defined APIs can include both lower-level APIs (e.g., activation functions, cost or error functions, nodes, edges, and tensors) and higher-level APIs (e.g., layers, convolutional NNs, recurrent NNs, linear classifiers, and so forth).

"Source code" can be used as an input to such a modelling framework to define a topology of the graph of a given ANN. In particular, APIs of a modelling framework can be instantiated and interconnected using source code to specify a complex ANN model. Different ANN models can be defined by using different APIs, different numbers of APIs, and interconnecting the APIs in different ways. ANNs can be defined, trained, and implemented using other types of tools in other configurations.

Overview of Quantized Artificial Neural Networks

A typical floating-point representation in a computer system consists of three parts: a sign, a mantissa, and an exponent. The sign indicates if the number is positive or negative. The bit width of the mantissa determines the precision to which numbers can be represented. In particular, the precision of the representation is determined by the precision of the mantissa. Common floating-point representations use a mantissa of 10 (float 16), 24 (float 32), or 53 (float 64) bits in width. The exponent modifies the magnitude of the mantissa.

Traditionally, ANNs have been trained and deployed using normal-precision floating-point format (e.g. 32-bit floating-point or "float32" format) numbers. As used herein, the term "normal-precision floating-point" refers to a floating-point number format having a sign, mantissa, and a per-number exponent. Examples of normal-precision floating-point formats include, but are not limited to, IEEE 754 standard formats, such as 16-bit, 32-bit, or 64-bit formats.

Performance, energy usage, and storage requirements of ANNs can be improved through the use of quantized-precision floating-point formats during training and/or inference. In particular, weights 110 and activation values (shown in FIGS. 2A and 2B) can be represented in a lower-precision quantized-precision floating-point format, which typically results in some amount of error being introduced. Examples of quantized-precision floating-point formats include formats having a reduced bit width (including by reducing the number of bits used to represent a number's mantissa or exponent) and block floating-point ("BFP") formats that use a small (e.g. 3, 4, or 5-bit) mantissa and an exponent shared by two or more numbers.

As shown in FIG. 1, quantization 118 can be utilized during both training 102 and inference 104. In particular, weights 110 and activation values generated by an ANN can be quantized through conversion from a normal-precision floating-point format (e.g. 16-bit or 32-bit floating-point numbers) to a quantized-precision floating-point format. On certain types of hardware, such as FPGAs, the utilization of quantized-precision floating-point formats can greatly improve the latency and throughput of ANN processing.

As used herein, the term "quantized-precision floating-point" refers to a floating-point number format where two or more values of a floating-point number have been modified to have a lower precision than when the values are represented in normal-precision floating-point. In particular, some examples of quantized-precision floating-point representations include BFP formats, where two or more floating-point numbers are represented with reference to a common exponent.

A BFP format number can be generated by selecting a common exponent for two, more, or all floating-point numbers in a set and shifting mantissas of individual elements to match the shared, common exponent. Accordingly, for purposes of the present disclosure, the term "BFP" means a number system in which a single exponent is shared across two or more values, each of which is represented by a sign and mantissa pair (whether there is an explicit sign bit, or the mantissa itself is signed).

Thus, and as illustrated in FIGS. 2A and 2B, sets of floating-point numbers can be represented using a BFP floating-point format by a single shared exponent value, while each number in the set of numbers includes a sign and a mantissa. For example, and as illustrated in FIG. 2A, the weights 110A-110C generated by an ANN can each include a per-weight sign 202A-202C and a per-weight mantissa 204A-204C, respectively. However, the weights 110A-110C share a common exponent 206A. Similarly, and as shown in FIG. 2B, the activation values 208A-208C generated by an ANN can each include a per-activation value sign 202D-202F and a per-activation value mantissa 204D-204F, respectively. The activation values 208A-208C, however, share a common exponent 206B. In some examples, the shared exponent 206 for a set of BFP numbers is chosen to be the largest exponent of the original floating-point values.

Use of a BFP format, such as that illustrated in FIGS. 2A and 2B, can reduce computational resources required for certain common ANN operations. For example, for numbers represented in a normal-precision floating-point format, a floating-point addition is required to perform a dot product operation. In a dot product of floating-point vectors, summation is performed in floating-point, which can require shifts to align values with different exponents. On the other hand, for a dot product operation using BFP format floating-point numbers, the product can be calculated using integer arithmetic to combine mantissa elements. As a result, a large dynamic range for a set of numbers can be maintained with the shared exponent while reducing computational costs by using more integer arithmetic, instead of floating-point arithmetic.

BFP format floating-point numbers can be utilized to perform training operations for layers of an ANN, including forward propagation and back propagation. The values for one or more of the ANN layers can be expressed in a quantized format that has lower precision than normal-precision floating-point formats. For example, BFP formats can be used to accelerate computations performed in training and inference operations using a neural network accelerator, such as an FPGA.

Further, portions of ANN training, such as temporary storage of activation values 208, can be improved by compressing a portion of these values (e.g., for an input, hidden, or output layer of a neural network) from normal-precision floating-point to a lower-precision number format, such as BFP. The activation values 208 can be later retrieved for use during, for example, back propagation during the training phase.

As discussed above, performance, energy usage, and storage requirements of ANNs can be improved through the use of quantized-precision floating-point formats during training and/or inference. The use of quantized-precision floating-point formats in this way can, however, have certain negative impacts on ANNs such as, but not limited to, a loss in accuracy. The technologies disclosed herein address these and potentially other considerations.

Outlier Quantization for Training and Inference (OQ)

Figure 3:
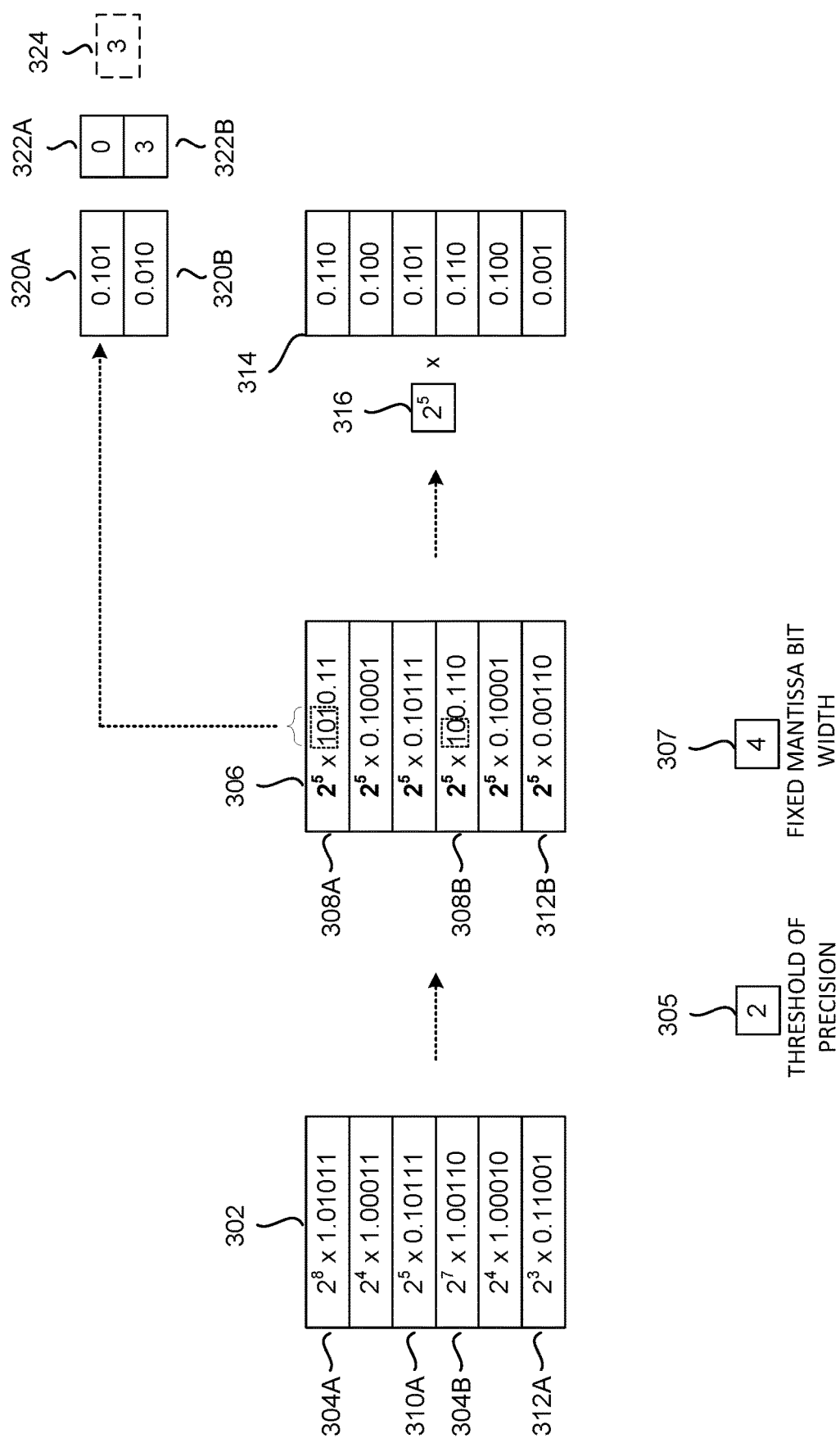
FIG. 3 is a block diagram that shows aspects of one mechanism for converting a vector of floating-point numbers to a vector of block floating-point numbers with outliers, according to one embodiment disclosed herein.

FIG. 3 is a block diagram that shows aspects of outlier quantization for ANN training and inference. In some configurations, ANN training and inference is performed using vectors of floating-point values. FIG. 3 illustrates converting a vector of floating-point values to BFP values with outliers. In some configurations, the floating-point numbers 302 are analyzed to identify outliers 304—i.e. numbers that are too large to be represented with a shared exponent 316 and a defined mantissa bit width 307. For example, value 304A ($2^8 \times 1.01011$) may be an outlier when the shared exponent is '5', but not if the shared exponent were '8' or '9'.

A shared exponent 316 may be determined in a variety of ways. The shared exponent may be selected to minimize the number of outliers in the set of floating-point numbers 302. However, other possibilities include avoiding values that are too small to be stored while maintaining a defined threshold of precision 305, choosing the most common exponent in the floating-point numbers 302, and the like.

In some configurations, once shared exponent 316 has been determined, outliers are identified as the floating-point numbers that are too large to store given the shared exponent 316, i.e. numbers have more than one digit to the left of the decimal point after shifting the decimal point to use the shared exponent 316. For example, outlier value 304A initially has an exponent of '8' and a mantissa of '1.01011.' The decimal point in the mantissa is shifted right three times to compensate for the exponent decreasing by three (i.e. by decreasing from '8' to '5').

After this shift, the mantissa will be '1010.11', which has more than one digit to the left of the decimal point, and so value 304A is identified as an outlier. Similarly, outlier value 304B has 3 digits to the left of the decimal point after shifting the decimal point to the right twice to compensate for using shared exponent 316, and so value 308B is also identified as an outlier. Floating-point value 310 ($2^5 \times 0.10111$) is not an outlier, because it already uses the shared exponent 316 ('5'), and as such does not have more than one digit to the left of the decimal point after shifting to use the shared exponent.

Floating-point value 312A ($2^3 \times 0.11001$) is not an outlier. Floating-point value 312A initially has an exponent ('3') that differs from the shared exponent 316 ('5'). However, the decimal point of 312A is shifted to the left twice as it is converted to 312B ($2^5 \times 0.00110$), and as such does not have any significant digits to the left of the shifted decimal point.

Once an outlier value is detected, the mantissa for the outlier value is spit into a low order portion, containing least significant bits, and a high order portion containing most significant bits. In some configurations the low order portion includes as many bits as the fixed mantissa bit width 307. In this example, the fixed mantissa bit width is four, and so four bits (i.e. 0.110) are selected to be stored in vector 314. Any remaining bits, e.g. bits '101' of value 308A, are stored as values 320 outside of vector 314. In some configurations, values 320 are associated with an element in vector 314 by an index value 322. For example, the higher order bits '101' are associated with the first entry in vector 314 (i.e. the $0^{th}$ index of vector 314), and so the index value 322A is '0'.

In some configurations, regardless of how many bits the higher order portion of the mantissa includes (e.g. '3' for 308A and '2' for 308B), 320 may include a fixed number of bits, and any excess bits may be filled with zero-padding. Additionally, or alternatively, one, some, or all of the values 320 may be associated with an exponent 324 that indicates what power of '2' to multiply the value 320 by when reconstituting the original value 304. Each value 320 may be associated with its own exponent, or all values 320 may be associated with the same exponent. In some configurations, the exponent is implicitly the number of fixed mantissa bits 307, essentially doubling the precision available to store BFP numbers.

Figure 4:
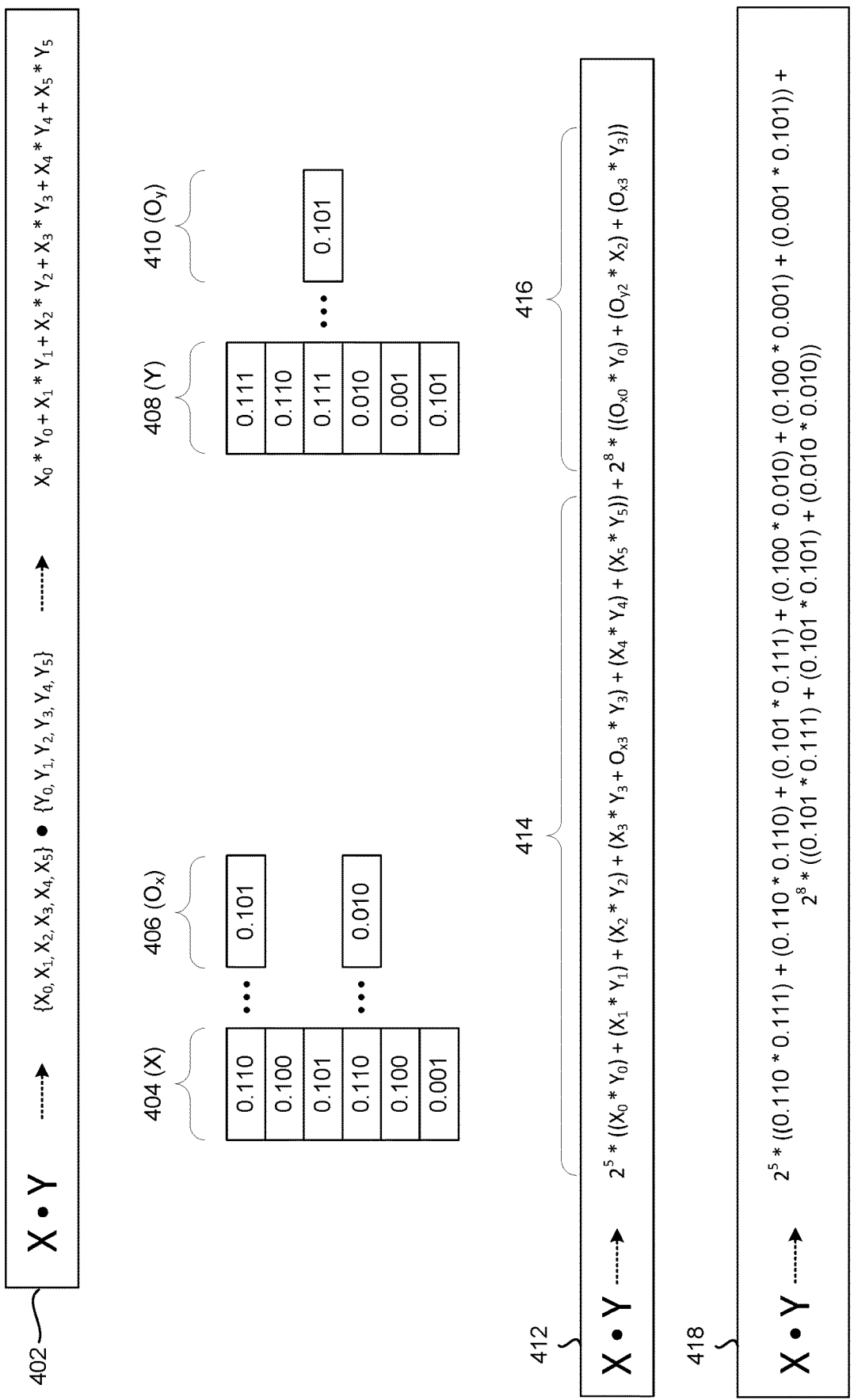
FIG. 4 is a block diagram that shows aspects of one mechanism for performing a dot product over two vectors of block floating-point numbers with outliers, according to one embodiment disclosed herein.

FIG. 4 is a block diagram that shows aspects of one mechanism for performing a dot product over two vectors of block floating-point numbers with outliers, according to one embodiment disclosed herein. In some configurations, dot products over vectors of block floating-point numbers are used to optimized matrix multiplications and convolution operations used to perform training and inference operations of ANNs. These operations may be performed in the context of forward and backward passes through the ANN.

FIG. 4 depicts the dot product of vectors X and Y. The traditional dot product operation 402 is depicted for reference, and to show how it is augmented to handle outlier values. Vector of BFP values 404(X) includes outlier values 406($O_x$) for the $0^{th}$ and $3^{rd}$ elements (i.e. $O_{x0}$ and $O_{x3}$, respectively). Similarly, vector 408(Y) includes a vector of BFP values, one of which is associated with outlier values 410($O_y$) for the $2^{nd}$ element ($O_{y2}$). Both 404(X) and 408(Y) are associated with exponents of 5, and the outlier values 406 and 410 are associated with exponents of 3.

In some configurations, the dot product is taken in part by performing a traditional dot product on vectors 404(X) and 408(Y), as depicted in portion 414 of dot product 412. Because vectors 404 and 408 utilize BFP, the result of the dot product is adjusted by the exponent, i.e. the result of the dot product is multiplied by '2' to the power of the exponent (in this case '5'). Any number of techniques may be used to perform this multiplication, including bit shift operations, native CPU floating-point operations, or the like. In some configurations, because the exponents are the same for elements of vectors X and Y, integer operations may be used to multiply the mantissas and sum the resulting products. Integer operations are inherently faster than comparable floating point operations, contributing to the technical effects described above.

The result of operation 414 may be added to the result of operation 416, which multiplies each of the outlier values by the values at the same index in the other vector. For example, value $O_{x0}$ which represents the outlier value '0.101' associated with the $0^{th}$ index of the 404(X) vector, is multiplied by the $0^{th}$ element of vector 408(Y) ('0.111'). The results of these multiplications are summed, and the result may be multiplied by two raised to the power of the shared exponent 316 added to the outlier exponent 324, i.e. $2^{5+3}$ or $2^8$. Block 418 illustrates the operation using actual values.

Other techniques for performing operations on vectors of BFP values with outliers are similarly contemplated. For example, instead of separating computation into operations 414 and 416, outlier values may be first used to reconstitute the original floating-point values, which are then used to perform the dot product or other operation. Specifically, for each element of BFP vector 404, any outlier values (e.g. $O_{x0}$) may be combined with their corresponding values (e.g. $X_0$), with the results being multiplied by $Y_0$, and if applicable, a similar combination of $Y_0$ and $O_{y0}$. Specifically, outlier values (e.g. $O_{x0}$) may be multiplied by 2 raised to the power of the shared exponent plus the outlier exponent and added to $X_0$ multiplied by 2 raised to the power of the shared exponent. This reconstitutes the original floating-point value. The result may then be multiplied by $Y_0$. Similar operations may be performed on the remaining elements of X and Y, and the results summed to compute the dot product.

Figure 5:
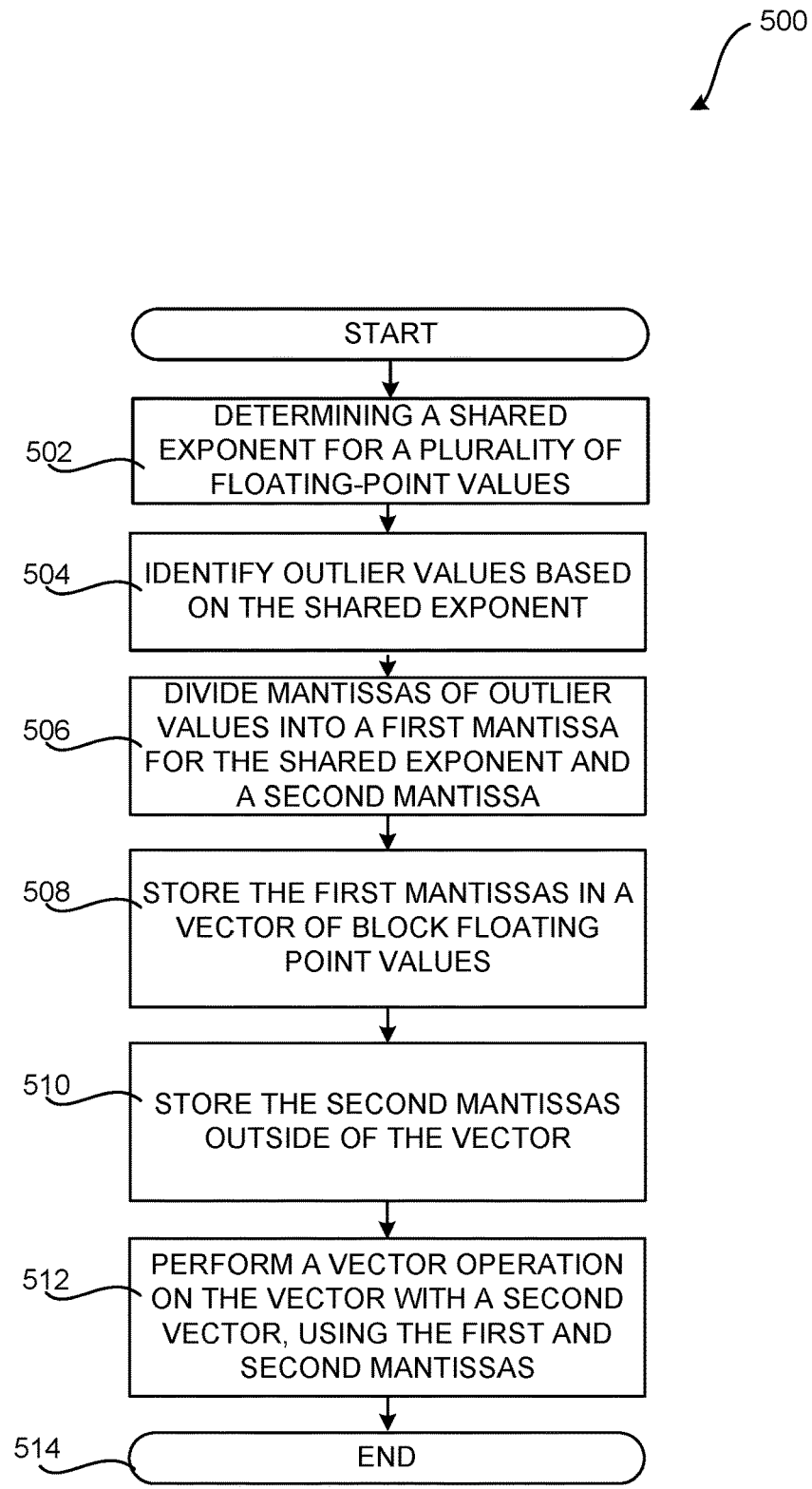
FIG. 5 is a flow diagram showing a routine that illustrates aspects of an illustrative computer-implemented process for outlier quantization for training and inference, according to one embodiment disclosed herein.

Referring now to FIG. 5, a flow diagram showing a routine 500 will be described that shows aspects of an illustrative computer-implemented process for outlier quantization for training and inference. It should be appreciated that the logical operations described herein with regard to FIG. 5, and the other FIGS., can be implemented (1) as a sequence of computer implemented acts or program modules running on a computing device and/or (2) as interconnected machine logic circuits or circuit modules within a computing device.

The particular implementation of the technologies disclosed herein is a matter of choice dependent on the performance and other requirements of the computing device. Accordingly, the logical operations described herein are referred to variously as states, operations, structural devices, acts, or modules. These states, operations, structural devices, acts and modules can be implemented in hardware, software, firmware, in special-purpose digital logic, and any combination thereof. It should be appreciated that more or fewer operations can be performed than shown in the FIGS. and described herein. These operations can also be performed in a different order than those described herein.

The routine 500 begins at operation 502, where a shared exponent for a plurality of floating-point values is determined. As discussed above in conjunction with FIG. 3, a shared exponent value may be the largest exponent value in the plurality of floating-point values, the most common value, the average value, or the like.

The routine 500 then proceeds from operation 502 to operation 504, where outlier values are identified based on the shared exponent. As discussed above in conjunction with FIG. 3, outlier values are values that cannot be stored after shifting the decimal point to use the shared exponent. The routine 500 then proceeds from operation 504 to operation 506.

At operation 506, the mantissa of an outlier is divided into a first mantissa, storing least significant bits, and a second mantissa storing most significant bits. In some configurations, the division is made so that the first mantissa has as many bits as the fixed mantissa bit width 307, while the remaining bits are part of the second mantissa. Additionally or alternatively, the division is made so that the second mantissa contains any bits to the left of the first digit to the left of the decimal point, and the remaining digits are stored in the first mantissa (e.g. for the number '1010.0011', the bits '101' are to the left of the first digit to the left of the decimal point).

The routine 500 then proceeds from operation 506 to operation 508, where the first mantissa is stored in the BFP vector. In some configurations, when the first mantissa has fewer bits than the fixed mantissa bit width 307, '0' bits are padded in the least significant places.

The routine 500 then proceeds from operation 508 to operation 510, where the second mantissa is stored outside the vector. In some configurations, the second mantissa is associated with the first mantissa by storing, proximate to the second mantissa, an index into the BFP vector of the first mantissa. In some configurations, the second mantissa is associated with an exponent used when reconstituting the original floating-point value by determining how far to shift the decimal place of the second mantissa before adding it to the first mantissa.

The routine 500 then proceeds from operation 510 to operation 512, where a vector operation is performed on the BFP vector with a second BFP vector. In some configurations, outlier values are processed as an additional step of the vector operation, e.g. operations 414 and 416 are discussed above in conjunction with FIG. 4 are processed separately, and then combined. Additionally, or alternatively, outlier values can be reconstituted first and then used to perform the requested vector operation. The routine 500 then proceeds from operation 512 to operation 514, where it ends.

Figure 6:
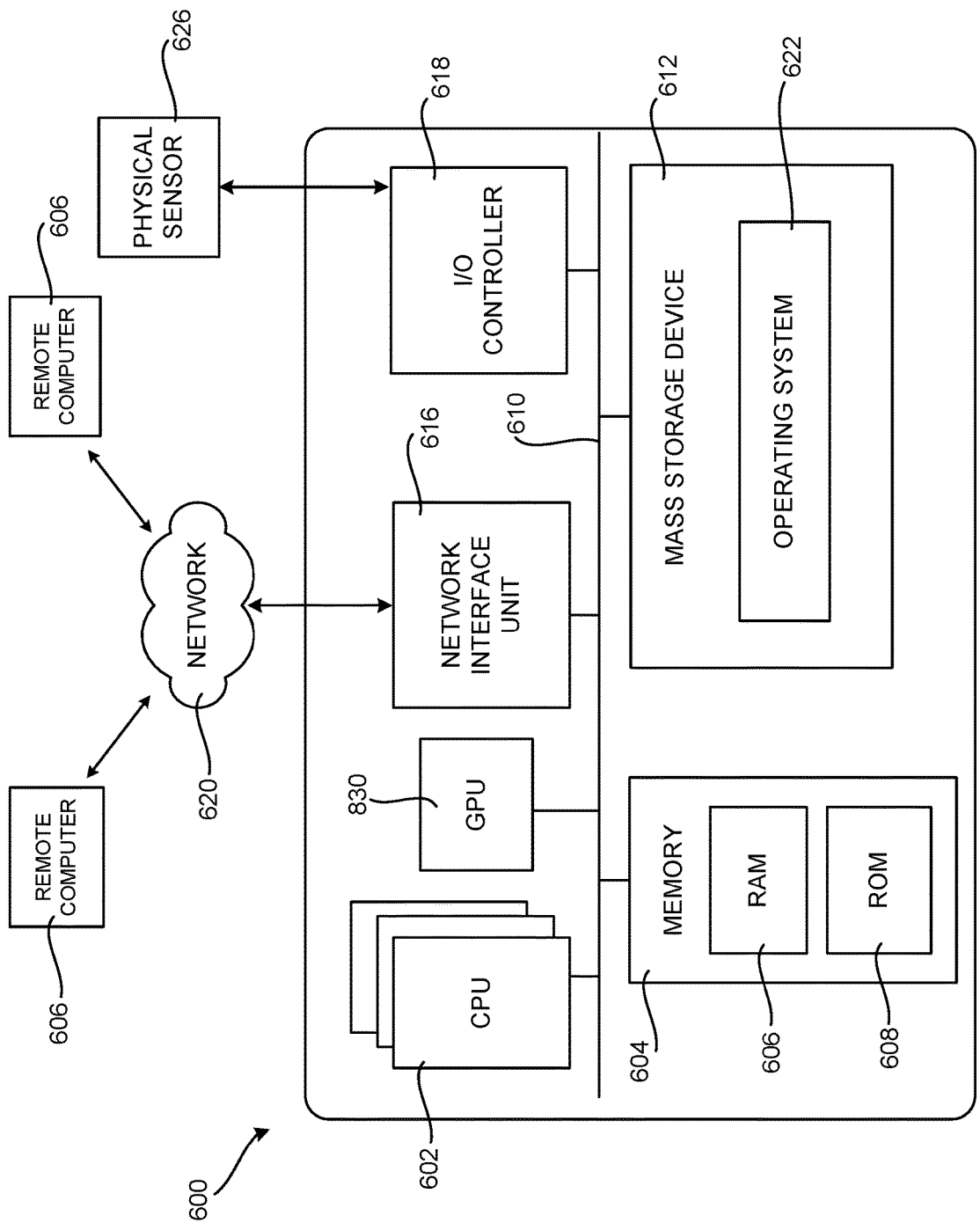
FIG. 6 is a computer architecture diagram showing an illustrative computer hardware and software architecture for a computing device that can implement aspects of the technologies presented herein.

FIG. 6 is a computer architecture diagram showing an illustrative computer hardware and software architecture for a computing device that can implement the various technologies presented herein. In particular, the architecture illustrated in FIG. 6 can be utilized to implement a server computer, mobile phone, an e-reader, a smartphone, a desktop computer, an alternate reality or virtual reality ("AR/VR") device, a tablet computer, a laptop computer, or another type of computing device.

While the subject matter described herein is presented in the general context of server computers performing training of an ANN, those skilled in the art will recognize that other implementations can be performed in combination with other types of computing systems and modules. Those skilled in the art will also appreciate that the subject matter described herein can be practiced with other computer system configurations, including hand-held devices, multiprocessor systems, microprocessor-based or programmable consumer electronics, computing or processing systems embedded in devices (such as wearable computing devices, automobiles, home automation etc.), minicomputers, mainframe computers, and the like.

The computer 600 illustrated in FIG. 8 includes one or more central processing units 602 ("CPU"), one or more GPUs 830, a system memory 604, including a random-access memory 606 ("RAM") and a read-only memory ("ROM") 608, and a system bus 610 that couples the memory 604 to the CPU 602. A basic input/output system ("BIOS" or "firmware") containing the basic routines that help to transfer information between elements within the computer 600, such as during startup, can be stored in the ROM 608. The computer 600 further includes a mass storage device 612 for storing an operating system 622, application programs, and other types of programs. The mass storage device 612 can also be configured to store other types of programs and data.

The mass storage device 612 is connected to the CPU 602 through a mass storage controller (not shown) connected to the bus 610. The mass storage device 612 and its associated computer readable media provide non-volatile storage for the computer 600. Although the description of computer readable media contained herein refers to a mass storage device, such as a hard disk, CD-ROM drive, DVD-ROM drive, or USB storage key, it should be appreciated by those skilled in the art that computer readable media can be any available computer storage media or communication media that can be accessed by the computer 600.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner so as to encode information in the signal. By way of example, and not limitation, communication media includes wired media such as a wired network or direct-wired connection, and wireless media such as acoustic, radio frequency, infrared and other wireless media. Combinations of the any of the above should also be included within the scope of computer readable media.

By way of example, and not limitation, computer storage media can include volatile and non-volatile, removable and non-removable media implemented in any method or technology for storage of information such as computer readable instructions, data structures, program modules or other data. For example, computer storage media includes, but is not limited to, RAM, ROM, EPROM, EEPROM, flash memory or other solid-state memory technology, CD-ROM, digital versatile disks ("DVD"), HD-DVD, BLU-RAY, or other optical storage, magnetic cassettes, magnetic tape, magnetic disk storage or other magnetic storage devices, or any other medium that can be used to store the desired information and which can be accessed by the computer 600. For purposes of the claims, the phrase "computer storage medium," and variations thereof, does not include waves or signals per se or communication media.

According to various configurations, the computer 600 can operate in a networked environment using logical connections to remote computers through a network such as the network 620. The computer 600 can connect to the network 620 through a network interface unit 616 connected to the bus 610. It should be appreciated that the network interface unit 616 can also be utilized to connect to other types of networks and remote computer systems. The computer 600 can also include an input/output controller 618 for receiving and processing input from a number of other devices, including a keyboard, mouse, touch input, an electronic stylus (not shown in FIG. 8), or a physical sensor such as a video camera. Similarly, the input/output controller 618 can provide output to a display screen or other type of output device (also not shown in FIG. 8).

It should be appreciated that the software components described herein, when loaded into the CPU 602 and executed, can transform the CPU 602 and the overall computer 600 from a general-purpose computing device into a special-purpose computing device customized to facilitate the functionality presented herein. The CPU 602 can be constructed from any number of transistors or other discrete circuit elements, which can individually or collectively assume any number of states. More specifically, the CPU 602 can operate as a finite-state machine, in response to executable instructions contained within the software modules disclosed herein. These computer-executable instructions can transform the CPU 602 by specifying how the CPU 602 transitions between states, thereby transforming the transistors or other discrete hardware elements constituting the CPU 602.

Encoding the software modules presented herein can also transform the physical structure of the computer readable media presented herein. The specific transformation of physical structure depends on various factors, in different implementations of this description. Examples of such factors include, but are not limited to, the technology used to implement the computer readable media, whether the computer readable media is characterized as primary or secondary storage, and the like. For example, if the computer readable media is implemented as semiconductor-based memory, the software disclosed herein can be encoded on the computer readable media by transforming the physical state of the semiconductor memory. For instance, the software can transform the state of transistors, capacitors, or other discrete circuit elements constituting the semiconductor memory. The software can also transform the physical state of such components in order to store data thereupon.

As another example, the computer storage media disclosed herein can be implemented using magnetic or optical technology. In such implementations, the software presented herein can transform the physical state of magnetic or optical media, when the software is encoded therein. These transformations can include altering the magnetic characteristics of particular locations within given magnetic media. These transformations can also include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer 600 in order to store and execute the software components presented herein. It also should be appreciated that the architecture shown in FIG. 8 for the computer 600, or a similar architecture, can be utilized to implement other types of computing devices, including hand-held computers, video game devices, embedded computer systems, mobile devices such as smartphones, tablets, and AR/VR devices, and other types of computing devices known to those skilled in the art. It is also contemplated that the computer 600 might not include all of the components shown in FIG. 8, can include other components that are not explicitly shown in FIG. 8, or can utilize an architecture completely different than that shown in FIG. 8.

Figure 7:
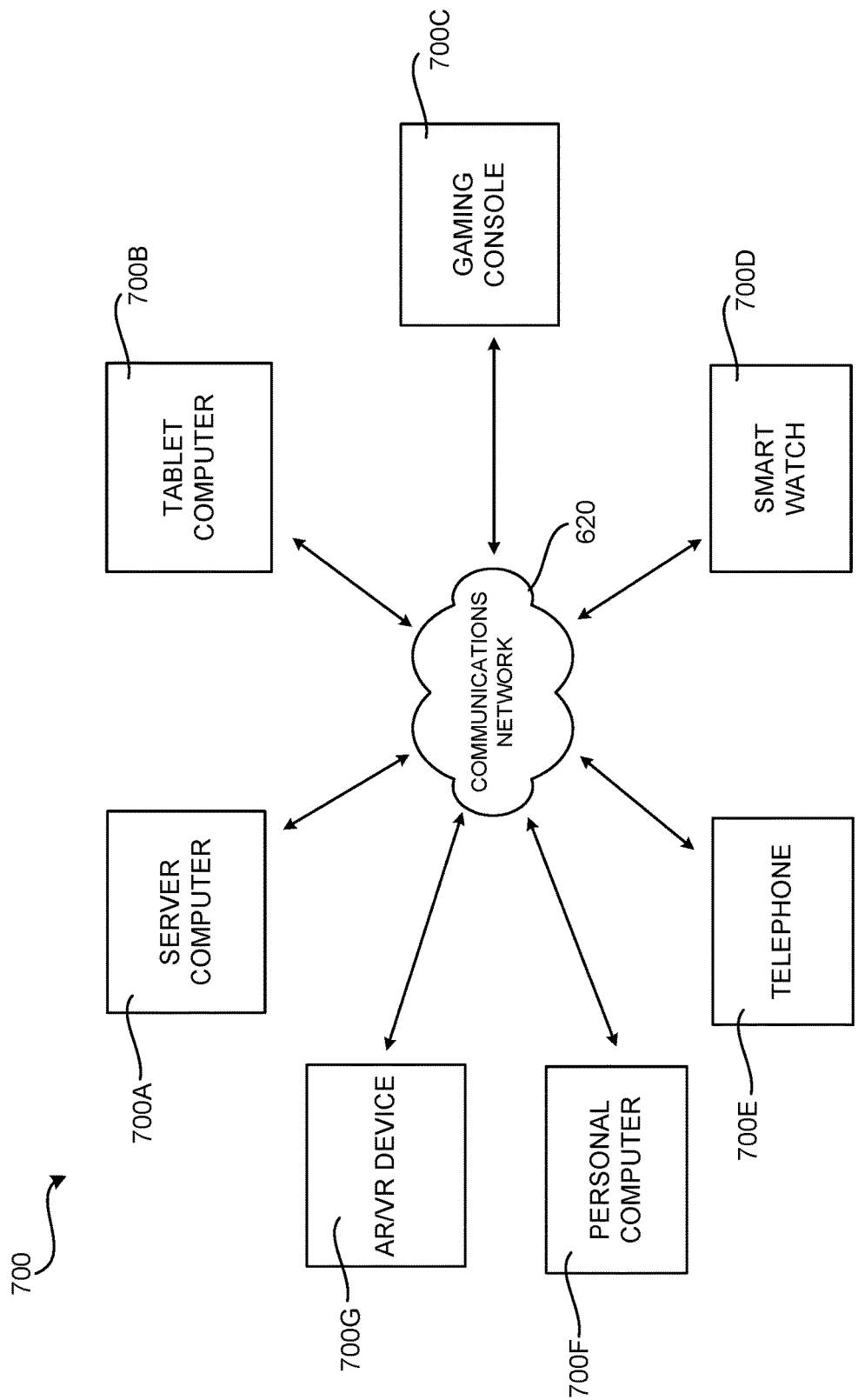
FIG. 7 is a network diagram illustrating a distributed computing environment in which aspects of the disclosed technologies can be implemented.

FIG. 7 is a network diagram illustrating a distributed network computing environment 700 in which aspects of the disclosed technologies can be implemented, according to various configurations presented herein. As shown in FIG. 7, one or more server computers 700A can be interconnected via a communications network 620 (which may be either of, or a combination of, a fixed-wire or wireless LAN, WAN, intranet, extranet, peer-to-peer network, virtual private network, the Internet, Bluetooth communications network, proprietary low voltage communications network, or other communications network) with a number of client computing devices such as, but not limited to, a tablet computer 700B, a gaming console 700C, a smart watch 700D, a telephone 700E, such as a smartphone, a personal computer 700F, and an AR/VR device 700G.

In a network environment in which the communications network 620 is the Internet, for example, the server computer 700A can be a dedicated server computer operable to process and communicate data to and from the client computing devices 700B-700G via any of a number of known protocols, such as, hypertext transfer protocol ("HTTP"), file transfer protocol ("FTP"), or simple object access protocol ("SOAP"). Additionally, the networked computing environment 700 can utilize various data security protocols such as secured socket layer ("SSL") or pretty good privacy ("PGP"). Each of the client computing devices 700B-700G can be equipped with an operating system operable to support one or more computing applications or terminal sessions such as a web browser (not shown in FIG. 7), other graphical user interface (not shown in FIG. 7), or a mobile desktop environment (not shown in FIG. 7) to gain access to the server computer 700A.

The server computer 700A can be communicatively coupled to other computing environments (not shown in FIG. 7) and receive data regarding a participating user's interactions/resource network. In an illustrative operation, a user (not shown in FIG. 7) may interact with a computing application running on a client computing device 700B-700G to obtain desired data and/or perform other computing applications.

The data and/or computing applications may be stored on the server 700A, or servers 700A, and communicated to cooperating users through the client computing devices 700B-700G over an exemplary communications network 620. A participating user (not shown in FIG. 7) may request access to specific data and applications housed in whole or in part on the server computer 700A. This data may be communicated between the client computing devices 700B-700G and the server computer 700A for processing and storage.

The server computer 700A can host computing applications, processes and applets for the generation, authentication, encryption, and communication of data and applications, and may cooperate with other server computing environments (not shown in FIG. 7), third party service providers (not shown in FIG. 7), network attached storage ("NAS") and storage area networks ("SAN") to realize application/data transactions.

It should be appreciated that the computing architecture shown in FIG. 7 and the distributed network computing environment shown in FIG. 7 have been simplified for ease of discussion. It should also be appreciated that the computing architecture and the distributed computing network can include and utilize many more computing components, devices, software programs, networking devices, and other components not specifically described herein.

The disclosure presented herein also encompasses the subject matter set forth in the following examples:

Example 1: A computer-implemented method, comprising: performing a machine learning operation while training an artificial neural network, wherein the machine learning operation includes performing an operation using a vector of floating-point values, wherein the floating-point values are represented by a plurality of mantissas and a shared exponent, wherein at least one of the mantissas represents part of an outlier value, and wherein another part of the outlier value is represented by an additional mantissa stored outside of the vector, wherein performing the operation includes performing a sub-operation using the outlier value, and wherein performing the sub-operation using the outlier value includes using the mantissa and the additional mantissa in conjunction with a corresponding value from a second vector of floating-point values.

Example 2: The computer-implemented method of Example 1, wherein the operation comprises a dot product applied to the vector of floating-point values and the second vector of floating-point values, and wherein the sub operation includes multiplying an element of the vector of floating-point values with a corresponding element of the second vector of floating-point values.

Example 3: The computer-implemented method of Example 1, wherein the operation is used to perform matrix multiplication or a convolution operation.

Example 4: The computer-implemented method of Example 3, wherein the matrix multiplication or the convolution operation is used to train the artificial neural network.

Example 5: The computer-implemented method of Example 3, wherein the matrix multiplication or the convolution operation is used to draw an inference from the artificial neural network.

Example 6: The computer-implemented method of Example 1, wherein the plurality of mantissas have a defined bit width.

Example 7: The computer-implemented method of Example 6, wherein an element of the vector of floating-point values is determined to be an outlier value when it cannot be stored with a defined number of digits of precision using the defined bit width and the shared exponent.

Example 8: The computer-implemented method of Example 1, wherein the outlier value is additionally represented with an additional exponent that is associated with the additional mantissa.

Example 9: A computer-implemented method for performing a training or inference operation over an artificial neural network, comprising: performing a machine learning operation while training the artificial neural network, wherein performing the machine learning operation includes performing a dot product operation using a first vector of floating-point values and a second vector of floating-point values, wherein at least one of the first vector of floating-point values comprises an outlier value, and wherein the outlier value is stored by splitting a full precision mantissa of the outlier value into a first mantissa portion that is stored in the first vector and a second mantissa portion that is stored outside of the first vector, wherein performing the dot product includes: summing the products of corresponding elements in the first and second vectors; and adding, to the sum, the product of the second mantissa portion, the element in the corresponding position of the second vector, and two raised to an exponent that is derived from the split of the full precision mantissa.

Example 10: The computer-implemented method of Example 9, wherein the first mantissa portion is associated with the second mantissa portion by storing an index of the first mantissa portion proximate to second mantissa portion.

Example 11: The computer-implemented method of Example 9, wherein the second mantissa portion represents the most significant bits of the outlier value and the first mantissa portion represents the least significant bits of the outlier value.

Example 12: The computer-implemented method of Example 9, wherein the first vector is associated with a shared exponent, wherein a decimal point of the full precision mantissa is shifted to use the shared exponent, and wherein the second mantissa is created based on digits to the left of a first digit to the left of the decimal point.

Example 13: The computer-implemented method of Example 12, wherein the first mantissa is created at least based on the first digit to the left of the decimal point and digits to the right of the decimal point.

Example 14: The computer-implemented method of Example 9, wherein a common exponent is determined for the first vector, wherein decimal points of full precision mantissas be stored in the first vector are shifted to use the common exponent, and wherein any portion of the mantissas to the left of the a first digit to the left of the decimal point are stored in a corresponding second mantissa outside of the first vector.

Example 15: The computer-implemented method of Example 14, wherein the number of bits that a full precision mantissa was shifted is stored proximate to the second mantissa.

Example 16: The computer-implemented method of Example 15, wherein performing the dot product includes concatenating the second mantissa to the first mantissa, summing the shared exponent and the number of bits that the full precision mantissa was shifted, multiplying the concatenated second mantissa and first mantissa by two raised to the power of the sum, and multiplying the result by the corresponding value in the second vector.

Example 17: The computer-implemented method of Example 15, wherein performing the dot product includes summing: the product of the first mantissa, two raised to the power of the shared exponent, and a corresponding value in the second vector; and the product of the second mantissa, two raised to the power of the shared exponent added to the number of bits that the full precision mantissa was shifted, and the corresponding value in the second vector.

Example 18: A computing device, comprising: one or more processors; and at least one computer storage media having computer-executable instructions stored thereupon which, when executed by the one or more processors, will cause the computing device to: performing a machine learning operation while training an artificial neural network, wherein performing the machine learning operation includes performing an operation using a vector of floating-point values, wherein the floating-point values are represented by a plurality of mantissas and a shared exponent, wherein the plurality of mantissas are derived from a plurality of processor-native floating-point representations, wherein at least one of the mantissas represents part of an outlier value, and wherein another part of the outlier value is represented by an additional mantissa stored outside of the vector; and wherein performing the operation includes performing a sub-operation using the outlier value, and wherein performing the sub-operation using the outlier value includes using the mantissa and the additional mantissa.

Example 19: The computing device of Example 18, wherein the plurality of mantissas are derived from the plurality of processor-native floating-point representations by shifting the decimal point of the processor-native floating-point representations to use the shared exponent, and storing, as one of the plurality of mantissas, up to a defined bit width, the first digit to the left of the decimal point and the digits to the right of the decimal point.

Example 20: The computing device of Example 18, wherein the shared exponent is determined based in part on a median exponent value of the plurality of processor-native floating-point representations.

Based on the foregoing, it should be appreciated that technologies for outlier quantization for training and inference have been disclosed herein. Although the subject matter presented herein has been described in language specific to computer structural features, methodological and transformative acts, specific computing machinery, and computer readable media, it is to be understood that the subject matter set forth in the appended claims is not necessarily limited to the specific features, acts, or media described herein. Rather, the specific features, acts and mediums are disclosed as example forms of implementing the claimed subject matter.

The subject matter described above is provided by way of illustration only and should not be construed as limiting. Various modifications and changes can be made to the subject matter described herein without following the example configurations and applications illustrated and described, and without departing from the scope of the present disclosure, which is set forth in the following claims.

What is claimed is:

1. A computer-implemented method, comprising:
performing a machine learning operation while training an artificial neural network, wherein the machine learning operation includes performing an operation using a vector of floating-point values, wherein the floating-point values are represented by a plurality of mantissas and a shared exponent, wherein at least one of the mantissas represents part of an outlier value, and wherein another part of the outlier value is represented by an additional mantissa stored outside of the vector,
wherein performing the operation includes performing a sub-operation using the outlier value, and
wherein performing the sub-operation using the outlier value includes using the mantissa and the additional mantissa in conjunction with a corresponding value from a second vector of floating-point values.

2. The computer-implemented method of claim 1, wherein the operation comprises a dot product applied to the vector of floating-point values and the second vector of floating-point values, and wherein the sub operation includes multiplying an element of the vector of floating-point values with a corresponding element of the second vector of floating-point values.

3. The computer-implemented method of claim 1, wherein the operation is used to perform matrix multiplication or a convolution operation.

4. The computer-implemented method of claim 3, wherein the matrix multiplication or the convolution operation is used to train the artificial neural network.

5. The computer-implemented method of claim 3, wherein the matrix multiplication or the convolution operation is used to draw an inference from the artificial neural network.

6. The computer-implemented method of claim 1, wherein the plurality of mantissas have a defined bit width.

7. The computer-implemented method of claim 6, wherein an element of the vector of floating-point values is determined to be an outlier value when it cannot be stored with a defined number of digits of precision using the defined bit width and the shared exponent.

8. The computer-implemented method of claim 1, wherein the outlier value is additionally represented with an additional exponent that is associated with the additional mantissa.

9. A computer-implemented method for performing a training or inference operation over an artificial neural network, comprising:
performing a machine learning operation while training the artificial neural network, wherein performing the machine learning operation includes performing a dot product operation using a first vector of floating-point values and a second vector of floating-point values, wherein at least one of the first vector of floating-point values comprises an outlier value, and wherein the outlier value is stored by splitting a full precision mantissa of the outlier value into a first mantissa portion that is stored in the first vector and a second mantissa portion that is stored outside of the first vector,
wherein performing the dot product includes:
summing the products of corresponding elements in the first and second vectors; and
adding, to the sum, the product of the second mantissa portion, the element in the corresponding position of the second vector, and two raised to an exponent that is derived from the split of the full precision mantissa.

10. The computer-implemented method of claim 9, wherein the first mantissa portion is associated with the second mantissa portion by storing an index of the first mantissa portion proximate to second mantissa portion.

11. The computer-implemented method of claim 9, wherein the second mantissa portion represents the most significant bits of the outlier value and the first mantissa portion represents the least significant bits of the outlier value.

12. The computer-implemented method of claim 9, wherein the first vector is associated with a shared exponent, wherein a decimal point of the full precision mantissa is shifted to use the shared exponent, and wherein the second mantissa is created based on digits to the left of a first digit to the left of the decimal point.

13. The computer-implemented method of claim 12, wherein the first mantissa is created at least based on the first digit to the left of the decimal point and digits to the right of the decimal point.

14. The computer-implemented method of claim 9, wherein a common exponent is determined for the first vector, wherein decimal points of full precision mantissas be stored in the first vector are shifted to use the common exponent, and wherein any portion of the mantissas to the left of the first digit to the left of the decimal point are stored in a corresponding second mantissa outside of the first vector.

15. The computer-implemented method of claim 14, wherein the number of bits that a full precision mantissa was shifted is stored proximate to the second mantissa.

16. The computer-implemented method of claim 15, wherein performing the dot product includes concatenating the second mantissa to the first mantissa, summing the shared exponent and the number of bits that the full precision mantissa was shifted, multiplying the concatenated second mantissa and first mantissa by two raised to the power of the sum, and multiplying the result by the corresponding value in the second vector.

17. The computer-implemented method of claim 15, wherein performing the dot product includes summing:

the product of the first mantissa, two raised to the power of the shared exponent, and a corresponding value in the second vector; and the product of the second mantissa, two raised to the power of the shared exponent added to the number of bits that the full precision mantissa was shifted, and the corresponding value in the second vector.

18. A computing device, comprising:

one or more processors; and at least one computer storage media having computer-executable instructions stored thereupon which, when executed by the one or more processors, will cause the computing device to:

perform a machine learning operation while training an artificial neural network, wherein performing the machine learning operation includes performing an operation using a vector of floating-point values, wherein the floating-point values are represented by a plurality of mantissas and a shared exponent, wherein the plurality of mantissas are derived from a plurality of processor-native floating-point representations, wherein at least one of the mantissas represents part of an outlier value, and wherein another part of the outlier value is represented by an additional mantissa stored outside of the vector; and wherein performing the operation includes performing a sub-operation using the outlier value, and wherein performing the sub-operation using the outlier value includes using the mantissa and the additional mantissa.

19. The computing device of claim 18, wherein the plurality of mantissas are derived from the plurality of processor-native floating-point representations by shifting the decimal point of the processor-native floating-point representations to use the shared exponent, and storing, as one of the plurality of mantissas, up to a defined bit width, the first digit to the left of the decimal point and the digits to the right of the decimal point.

20. The computing device of claim 18, wherein the shared exponent is determined based in part on a median exponent value of the plurality of processor-native floating-point representations.

* * * * *